(12) United States Patent
Smyers et al.

(10) Patent No.: US 8,165,924 B2
(45) Date of Patent: Apr. 24, 2012

(54) VIRTUAL SHOPPING CENTER

(75) Inventors: Scott Smyers, Los Gatos, CA (US); Mark Eyer, Woodinville, WA (US)

(73) Assignees: Sony Corporation, Tokyo (JP); Sony Electronics, Inc., Parkridge, NJ (US)

( * ) Notice: Subject to any disclaimer, the term of this patent is extended or adjusted under 35 U.S.C. 154(b) by 998 days.

(21) Appl. No.: 11/945,873

(22) Filed: Nov. 27, 2007

(65) Prior Publication Data
US 2009/0138376 A1   May 28, 2009

(51) Int. Cl.
*G06Q 30/00* (2006.01)
(52) U.S. Cl. ........... 705/26.62; 705/26.61; 705/26.63; 705/26.64; 715/706
(58) Field of Classification Search ........ 705/26.1–27.2, 705/14.4–17.73, 26.1–27.24; 715/706
See application file for complete search history.

(56) References Cited

U.S. PATENT DOCUMENTS

| | | | |
|---|---|---|---|
| 6,256,043 B1 | 7/2001 | Aho et al. | |
| 6,318,868 B1 | 11/2001 | Larussa | |
| 6,381,583 B1 | 4/2002 | Kenney | |
| 6,519,571 B1 | 2/2003 | Guheen et al. | |
| 6,580,441 B2 | 6/2003 | Schileru-Key | |
| 6,837,436 B2 | 1/2005 | Swartz et al. | |
| 6,901,378 B1 | 5/2005 | Linker et al. | |
| 7,418,447 B2* | 8/2008 | Caldwell et al. | 705/26.1 |
| 7,729,951 B2* | 6/2010 | Dawson et al. | 705/27.2 |
| 2002/0095411 A1* | 7/2002 | Caldwell et al. | 707/5 |
| 2002/0126672 A1* | 9/2002 | Chow et al. | 370/392 |
| 2005/0177463 A1* | 8/2005 | Crutchfield et al. | 705/27 |
| 2006/0253421 A1* | 11/2006 | Chen et al. | 707/2 |
| 2007/0078726 A1* | 4/2007 | MacDonald Korth et al. | 705/26 |
| 2007/0100709 A1* | 5/2007 | Lee et al. | 705/26 |
| 2007/0179867 A1 | 8/2007 | Glazer et al. | |
| 2007/0192203 A1 | 8/2007 | Di Stefano | |
| 2007/0288330 A1* | 12/2007 | Vaid | 705/26 |
| 2008/0071614 A1* | 3/2008 | Mebruer | 705/14 |
| 2008/0077504 A1* | 3/2008 | Gausebeck et al. | 705/26 |
| 2008/0263446 A1* | 10/2008 | Altberg et al. | 715/706 |
| 2009/0006216 A1* | 1/2009 | Blumenthal et al. | 705/26 |
| 2010/0191657 A1* | 7/2010 | Melideo | 705/80 |

FOREIGN PATENT DOCUMENTS

| | | |
|---|---|---|
| WO | WO0073955 A2 | 12/2000 |
| WO | WO0073957 A2 | 12/2000 |
| WO | WO0203164 A2 | 1/2002 |

OTHER PUBLICATIONS

New ways to search an endless Web; Three new features try to sort through the multimedia static.(Business) Kopytoff, Verne San Francisco Chronicle, p. E1 Jul. 4, 2005.*

* cited by examiner

*Primary Examiner* — William Allen
(74) *Attorney, Agent, or Firm* — Trellis IP Law Group, PC (57) ABSTRACT

In one embodiment, a method of controlling a virtual shopping center can include: receiving a user input at a query input engine; aggregating an output from the query input engine with a user preference, such as a purchase history or other expressed interest, to form a search criteria; searching a database using the search criteria; and displaying an image associated with a matching product or service resulting from the search of the database.

20 Claims, 6 Drawing Sheets

VIRTUAL SHOPPING CENTER

BACKGROUND

Particular embodiments generally relate to search processes.

Typical online shopping experiences include shoppers using websites to access specific vendors or stores. The search may be performed by typing in keywords in a query. A search engine then identifies particular products that are deemed to match the query. The search results are provided in a list format. For example, the top ten results may be listed. These are usually hyperlinks to other websites. To actually reach the product the shopper desires may involve navigation through various web pages, and this process may be burdensome to the shopper.

SUMMARY

In one embodiment, a method of controlling a virtual shopping center can include: receiving a user input at a query input engine; aggregating an output from the query input engine with a user preference to form a search criteria; searching a database using the search criteria; and displaying an image associated with a matching product or service resulting from the search of the database.

A further understanding of the nature and the advantages of particular embodiments disclosed herein may be realized by reference to the remaining portions of the specification and the attached drawings.

DETAILED DESCRIPTION OF EMBODIMENTS

Particular embodiments provide an approach for creating a virtual shopping center that allows potential product vendors and contractors (e.g., service providers) to describe product offerings in a metadata-based machine readable form. The approach allows shoppers to express arbitrarily diverse or specific shopping needs and interests in natural language. Their needs and interests can be reduced into a metadata-based machine readable form for matching a shopper's needs and interests with that of product or service offerings. The virtual shopping center may then be populated for presentation to the shopper including those goods and services that are most relevant to the shopper, while excluding those known to be of little current interest.

Certain embodiments generally address the common consumer problem of shopping for something specific through channels that offer products and/or services that are chosen using criteria unrelated to the shopper's intentions, priorities, or preferences. In certain embodiments, goods and/or services are represented in a machine readable form (e.g., using eXtensible Markup Language (XML)), and shopper-specific needs/interests and priorities can be matched against these product representations. Further, other information can also be included along with a shopper's needs or interests, such as life circumstances (e.g., an impending marriage or birth, anniversary or birthday, upcoming holiday, as well as relevant recipients, such as a Mother's Day event when the shopper has a mother, mother-in-law, stepmother, and/or wife who is a new mother, etc.).

Particular embodiments can include matching available goods and services with expressed interests and priorities of a shopper, together with underlying background information about life situations and/or other circumstances related to the shopper, to create a custom offering of goods and services that match the shopper's situation. For example, a shopper known to be athletically inclined may be presented with a selection of size 9 athletic shoes when the expressed situation was an immediate need for sneakers. Further, size or other search criteria may be derived from other sources (e.g., user preferences, activity on other shopping sites, purchase history), and may not necessarily have been provided explicitly by the shopper to shape the shopping experience.

Another experience might be a virtual shopping center or mall populated by some storefronts providing a variety of tech gear corresponding to an expressed interest in a nonspecific gift targeted for someone who enjoys such a genre of gadgets. The virtual shopping center displays goods as a user may experience if they were actually at a store (e.g., a brick and mortar store). For example, if a user was physically at a shoe store, the user would see shoes on a wall or on racks. In the virtual shopping center, if the query is for size 9 shoes, a store may be populated with a rack of size 9 shoes. For example, pictures of the size 9 shoes may be arranged on the rack for the shopper's immediate perusal. Thus, the shopper does not have to select links to go to different pages in order to see the shoes, but rather can virtually walk around a mall populated with items of interest to that shopper.

Particular embodiments can provide an enhanced shopping service (e.g., at a cost to the shopper) for those who want an experience that is substantially removed from the direct business interests of the merchants. This approach may be more efficient or comfortable to the shopper, since the virtual shopping center displays goods and/or services most aligned with the expressed interests and priorities of the shopper, and perhaps additional items related to the shopper's user preferences and/or other previously expressed interests.

Figure 1:
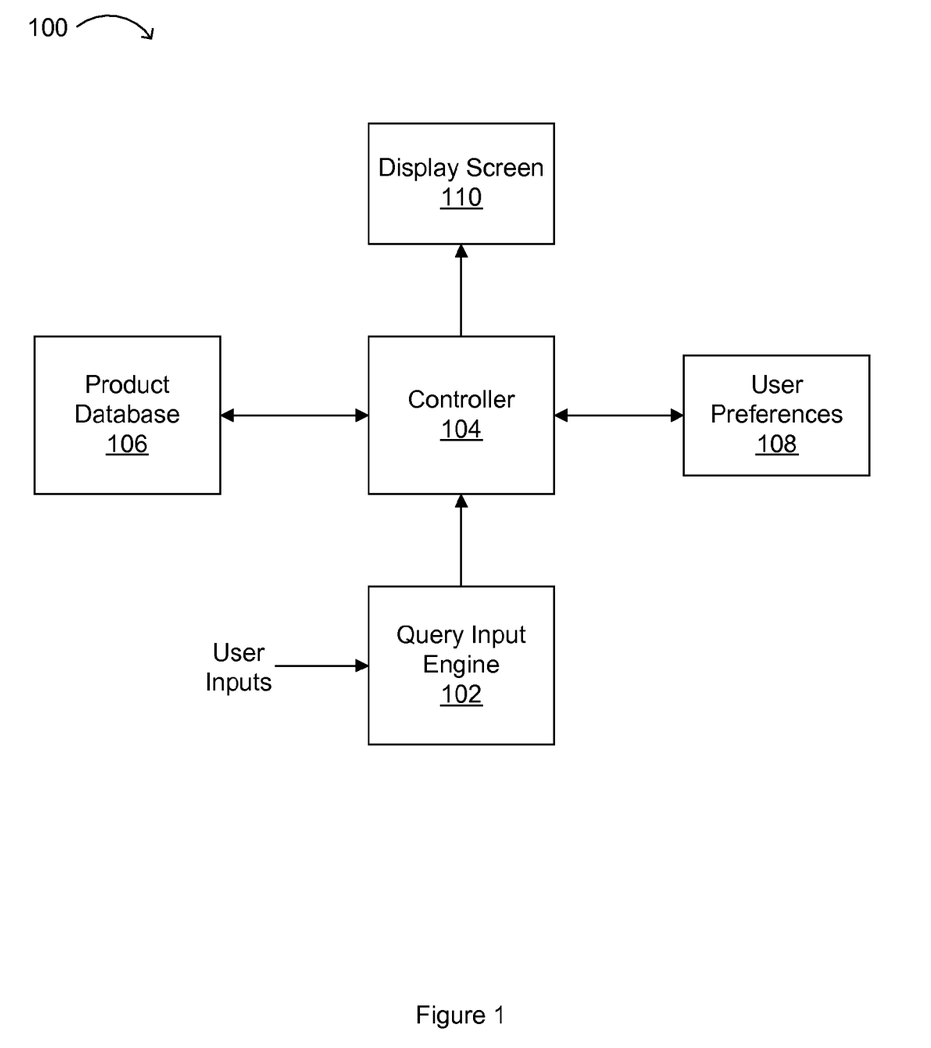
FIG. 1 illustrates an example virtual shopping center control system in accordance with embodiments of the present invention.

FIG. 1 shows an example virtual shopping center control system 100 in accordance with embodiments of the present invention. User inputs can be received via query input engine 102, for conversion to controller 104. For example, natural language can be utilized to convey general product preferences and/or specific products/services of interest at a particular time. The natural language may be a query that is similar to a user speaking in general language. The query may express the user's needs and/or interests. In one particular example, query input engine 102 can include a speech recognition engine for converting user voice commands into text queries.

User preferences 108 can also store preferences including distilled inputs via query input engine 102, as well as preferences obtained from other sources, such as previously input preferences. For example, additional user preference sources include histories of prior purchases, and the merging of personal data from other sources (e.g., other websites or online communities, etc.). Further, offerings provided by a virtual shopping center in particular embodiments may be adjusted based on consumer report-type input (e.g., to favor products that have been highly rated, and to avoid even offering products that people have been complaining about or have found unsatisfactory). In addition, user purchase histories can allow the system to suggest replacing items that may be past their useful life (e.g., another pair of shoes to replace the ones that may be worn out).

Controller 104 can receive inputs from user preferences 108, query input engine 102, and product database 106. Product database 106 can store product descriptions, photos, videos, virtual reality representations or components of products, or any other suitable description for goods and/or services. For example, XML or other metadata-based constructs can be utilized in such product and/or service descriptions. Controller 104 can essentially map one or more products found in product database 106 with user preferences 108 and/or user inputs via query input engine 102. A resulting display provided to display screen 110 can then include a view (e.g., a virtual reality or video game like display) of those products that match criteria provided by the user. For example, a user may view the resulting display on a personal computer, cellular phone, laptop computer, etc., and display screen 110 can be part of a client computer, while other processing engines (e.g., query input engine 102, controller 104, etc.) may be part of a server that communicates through a network.

Figure 2:
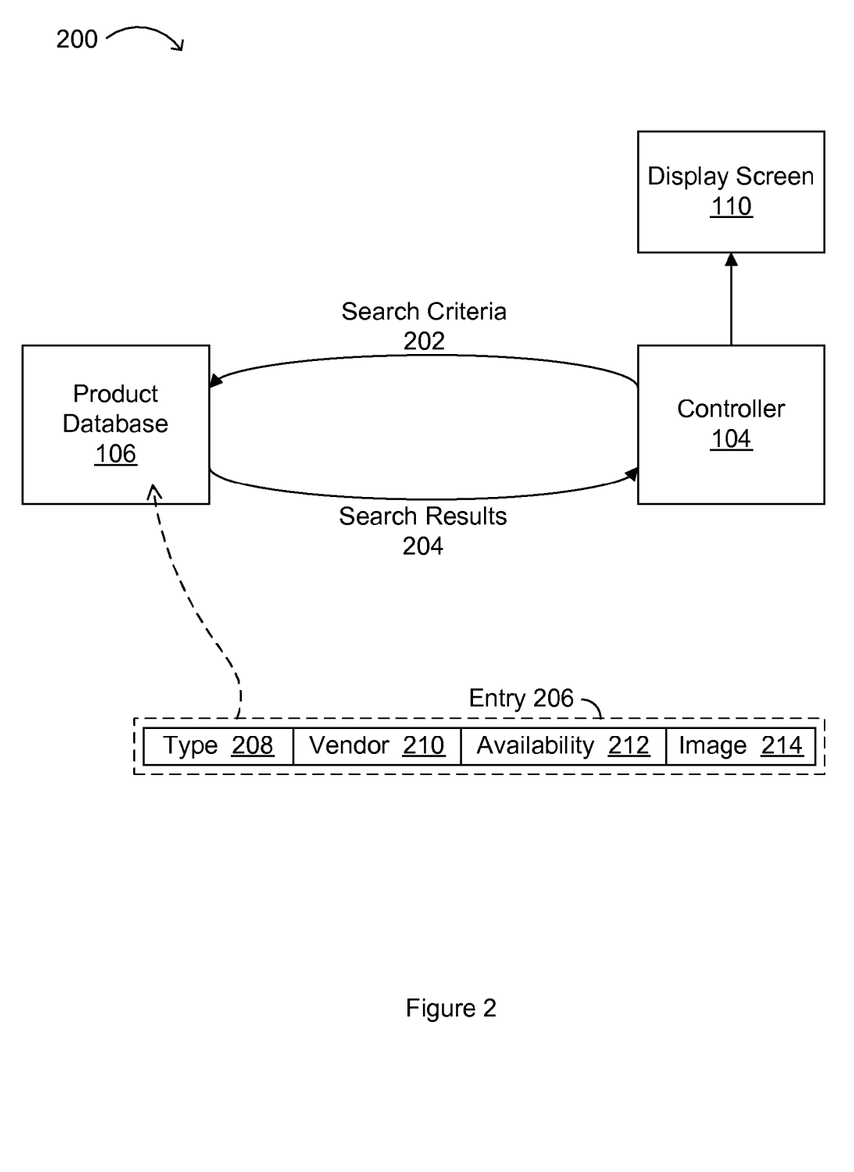
FIG. 2 illustrates an example product database search flow in accordance with embodiments of the present invention.

FIG. 2 shows an example product database search flow 200 in accordance with one embodiment. In determining which products to display on display screen 110, controller 104 can forward search criteria 202 to product database 106. Such search criteria can involve previously stored user preferences, as well as the query entered, and/or any other suitable command indications. Product database 106 can be searched using a software-based search algorithm and/or a hardware-based solution, such as a content-addressable memory (CAM) implementation using search criteria 202, or a portion or derivation thereof, as a search or lookup key. Further, product database 106 can include distributed storage mediums, and may be remotely accessed via the Internet.

Search results 204 can include metadata-based representations of products found in product database 106. These other associated representations can then be displayed on display screen 110 in a virtual shopping center. For example, a virtual reality, interactive 360° view, or other suitable representation of the products (e.g., on a store shelf) can be provided on display screen 110. In addition, product database 106 can be organized as any number of entries 206. For example, each entry can include a product type field 208, a vendor field 210, an availability indication 212, and an image field 214. Image 214 can be a link to an image, and may be a still picture, video, audio, or any suitable medium of expression. Further, other fields, such as those including more product details (e.g., price, distance for pickup of goods, etc.), can also be included in specific embodiments.

Figure 3:
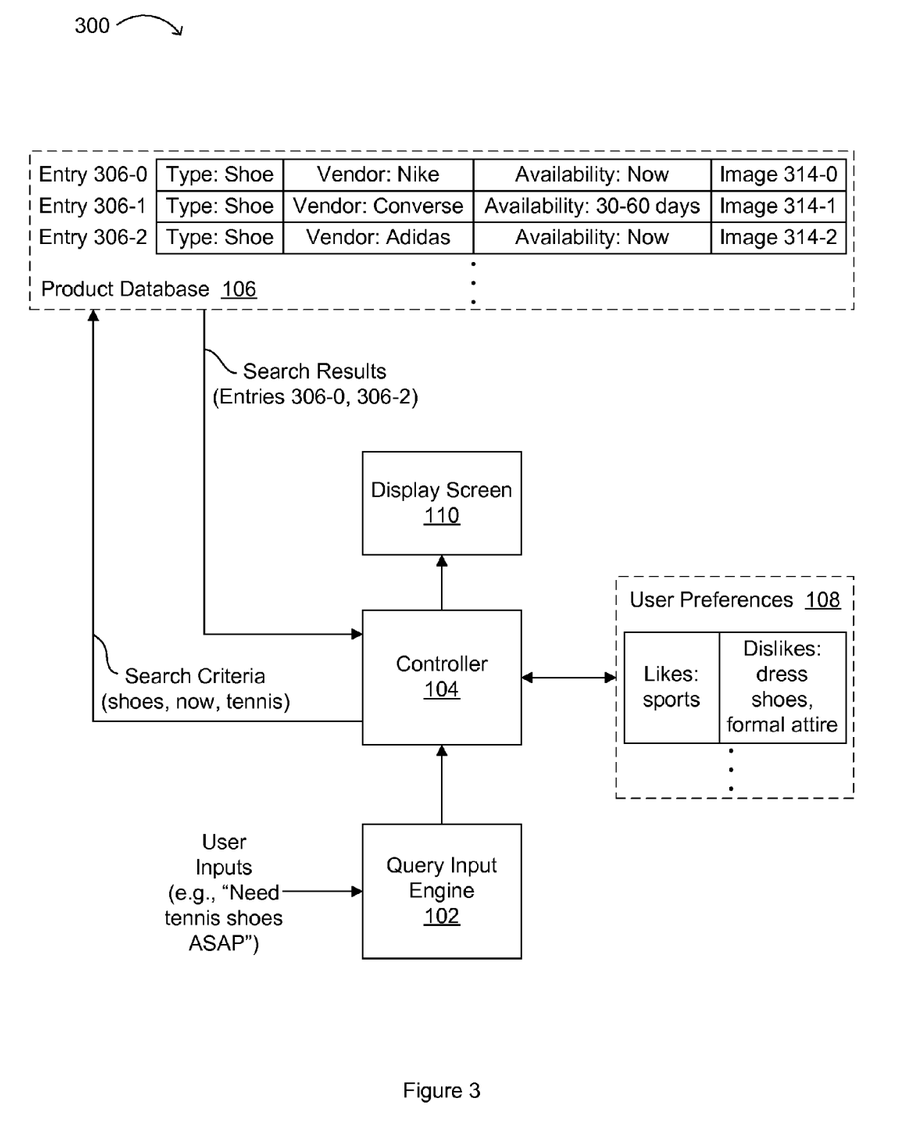
FIG. 3 illustrates a virtual shopping center control system for a shoe shopping example in accordance with embodiments of the present invention.

FIG. 3 shows a virtual shopping center control system for a shoe shopping example 300 in accordance with embodiments of the present invention. In this particular example, controller 104 can aggregate inputs from query input engine 102 with user preferences 108. The shopper or user may express a need for obtaining shoes right away, and user preferences for this particular user can include a like for sports, and dislikes for formal attire and dress shoes. Of course, other preferences, as well as any number of entries for other users, can also be accommodated in particular embodiments.

Product database 106 can include any number of entries (e.g., entries 306-0, 306-1, and 306-2), where each entry includes information descriptive of or related to a particular product that can be displayed in a virtual shopping center. Entry 306-0 can include a product type of shoe from Nike, with current availability, and with an associated image 314-0. Entry 306-1 can include a shoe product type from Converse, with a delayed availability of 30-60 days, and an associated image 314-1. Also, entry 306-2 can include a shoe type product indication from Adidas, with current availability, and an associated image 314-2. Other fields can be defined (e.g., using metadata, XML, etc.) or modified as desired by a vendor or service provider.

Entries 306 may include information that facilitates the display of the virtual shopping center. For example, the entry may include an image (e.g., images 314-0, 314-1, 314-2, etc.) that should be first displayed. Additional information may be linked to the image and may be displayed if a user selects the image, hovers a mouse over the image, or otherwise interacts with the image.

In order to search product database 106 effectively, aggregated search criteria compiled via controller 104 can include a product type of shoes, with current availability, and where the shoes are athletic type shoes (e.g., not formal dress shoes). Thus, the search criteria of shoes and current availability can be derived via the query input to query input engine 102, while the search criteria of athletic or tennis type shoes can be derived from likes/dislikes in user preferences 108. In this fashion, an aggregated search criteria or search key can be formed in controller 104 and supplied to product database 106. As a result of the search, entries 306-0 and 306-2 can be selected for display (e.g., via associated images 314-0 and 314-2, respectively) in the virtual shopping center.

Figure 4:
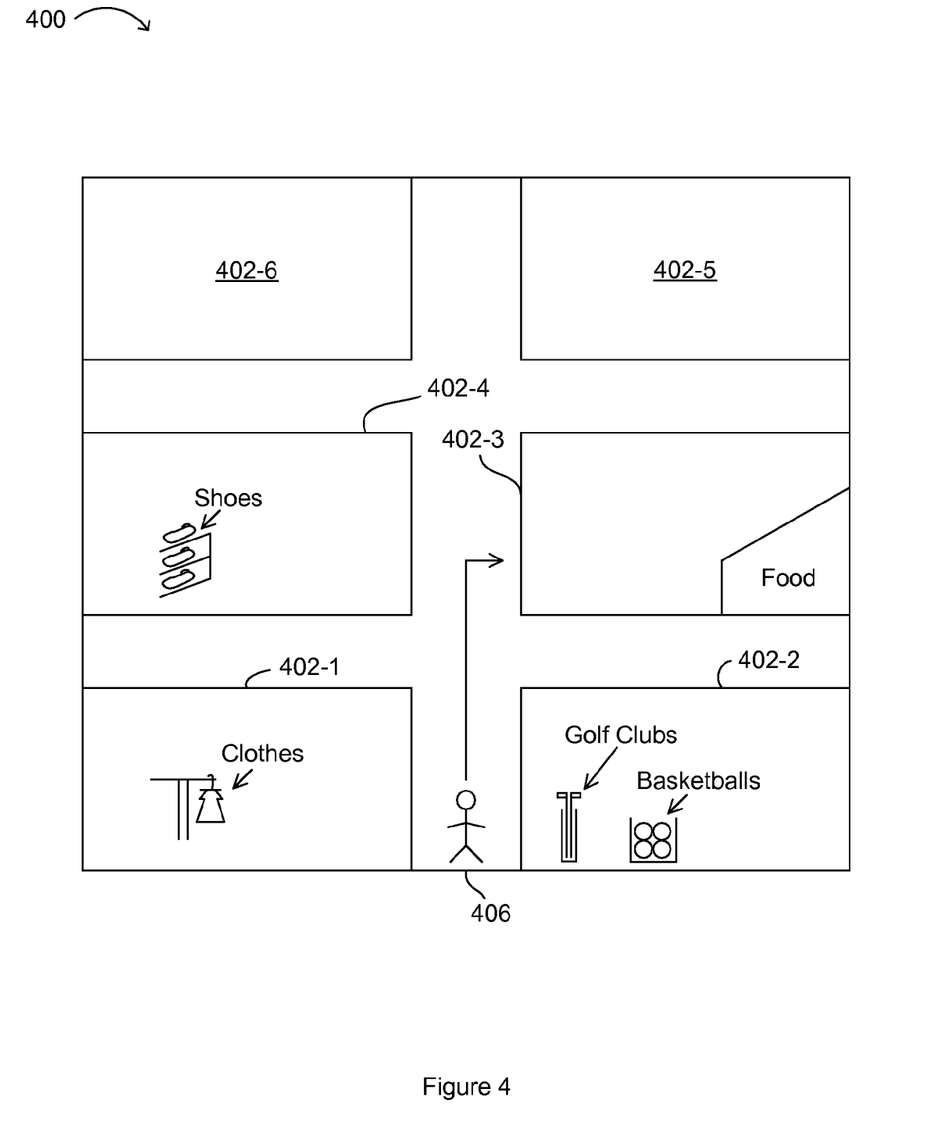
FIG. 4 illustrates a view of an example virtual shopping center in accordance with embodiments of the present invention.

FIG. 4 shows a view of an example virtual shopping center 400 according to one embodiment. A user may be presented with a 3D-like model of virtual shopping center 400. Virtual shopping center 400 may be a mall where sections 402 are various stores or product arrangements that are selling different goods. For example, section 402-1 may be a clothes arrangement, section 402-2 may be a sporting goods arrangement, etc. Also, virtual shopping center 400 may be a virtual "store" that is selling different goods supplied from different manufacturers and/or different physical stores.

A user can navigate through virtual shopping center 400 by maneuvering (e.g., using a scroll wheel on a mouse, using virtual reality apparatus on a body, etc.) through the aisles as one would if actually in a physical store. For example, a first person view is provided that allows a user to control where in center 400 the user goes. In one example, the user may first appear at a position 406 at the front of center 400. The user may see certain images of goods in sections 402-1 and 402-2. Accordingly, vendors that desire their goods to be in these sections may be charged more because of their prime location. If a user sees something of interest, then the user may navigate into a section 402 to view the items more closely. For example, the user may be interested in the golf clubs pictured in section 402-2. The golf clubs may be selected (e.g., via a mouse click), and more information may be provided to the user. Also, an additional selection of golf clubs may be displayed for a user to view because the user has expressed an interest in the golf clubs.

Certain embodiments can allow for navigation through the virtual shopping center by describing shopper interests in natural language. For example, if a shopper is looking for shoes or handbags, a virtual walk-through of a "store" populated with vendors selling shoes and handbags can be established. As another example, the user may enter a query (e.g., by typing, or speaking when a speech recognition engine is included) of food, and be automatically brought to section 402-3. However, a user can also control the navigation by essentially walking around as if in a real store, yet the user is in a virtual reality. However, this virtual reality accommodates actual purchases of products, as in present Internet-related shopping. Further, the virtual reality can be enhanced using three-dimensional (3D) images (e.g., of shoes). In addition, vendors that pay the most (e.g., to a host provider) can obtain placements for their products closer to the door, or on preferred shelves or racks. Thus, vendors can negotiate for position, area, store design, or any aspect of product display positioning.

If the user does not find anything of interest, the user may provide another query. In response, virtual shopping center 400 may be populated with other goods. Thus, sections 402 may be recreated with different items that may be of interest to the user. The items that are presented are the ones that are considered most relevant to a user. A user does not have to navigate around the whole center 400 to determine an item of interest among items displayed items that are not of interest. Thus, the virtual shopping experience may be more efficient and provide a user a better experience than actually shopping in a real store.

Figure 5:
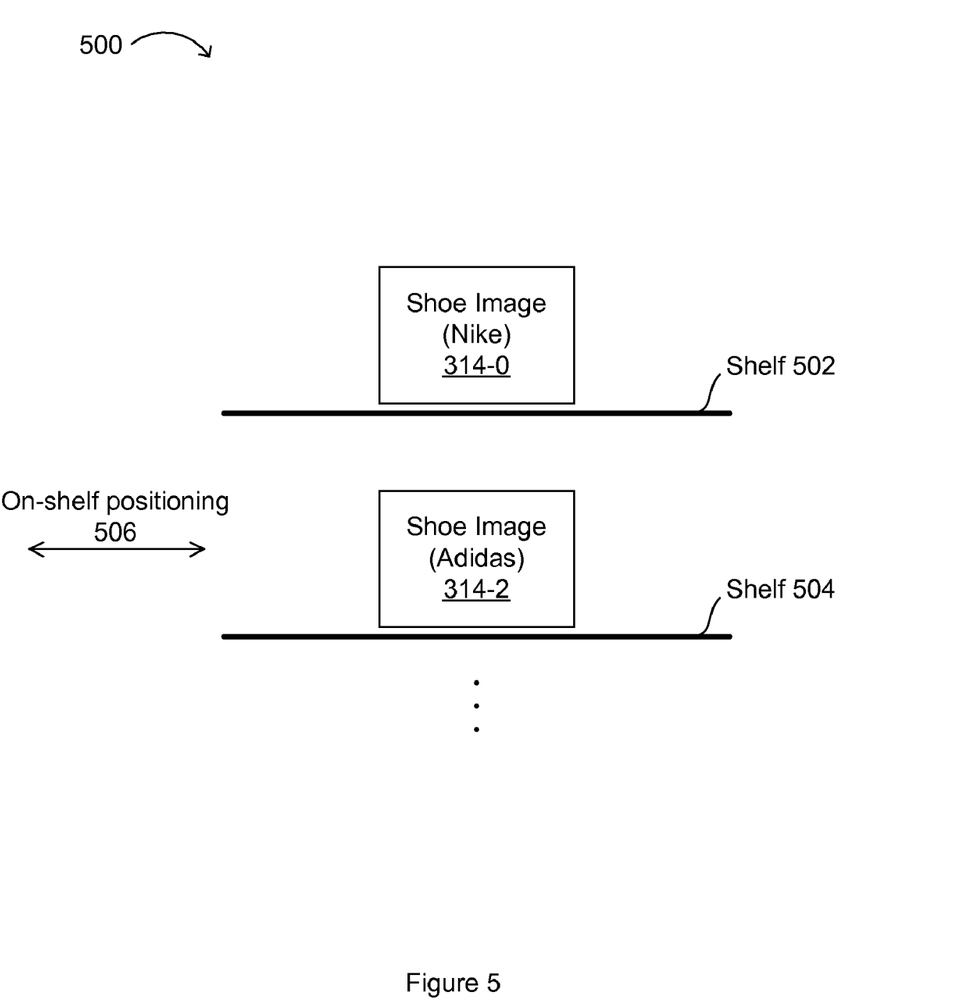
FIG. 5 illustrates an example product display in a virtual shopping center in accordance with embodiments of the present invention.

FIG. 5 shows an example product display 500 in a virtual shopping center in accordance with one embodiment. The products found from searching product database 106 can be displayed on display screen 110. For example, Nike shoe image 314-0 can be displayed on shelf 502 above the Adidas shoe image 314-2 on shelf 504. On-shelf positioning 506, as well as assignments to certain shelves (e.g., 502, 504, etc.), can be determined based on a variety of factors. For example, vendors may pay more for prime shelf locations or positions. Alternatively or in addition, search results may be prioritized based on the best matches, the next best matches, and so on. Toward this end, Converse shoe image 314-1 may also be displayed even though the availability did not fully match the user's desires, but associated image 314-1 might be displayed on a bottom shelf or a least preferable shelf position in this case.

In particular embodiments, software can be used to create an interactive shopping environment. Here, a virtual store becomes populated with vendors selling things that are of particular interest to the user. The user experience can include population of shelves and aisles of a virtual shopping center with products, such as shirts of a particular size. This approach differs from search results simply presented in the form of a list, where the user may have to indicate a desire to see, e.g., the next 10 matching items. In contrast, particular embodiments can utilize a product database search, or even results from a common Internet search engine (e.g., a Google list), and then create a shopping center representation therefrom.

Also in certain embodiments, a user can zoom in or out using any suitable interactive tool or device, as well as pan, rotate, etc., to view objects representing products in a virtual shopping center. The user may also refine the contents of the virtual shopping center via continued inputs using natural language. Further, the products and the virtual store can be displayed independently of the actual store in which the products are available. This approach operates on the assumption that a consumer cares more about a particular product than a certain store. However, display of products can also be organized according to actual stores, and this may be set in user preferences 108.

Figure 6:
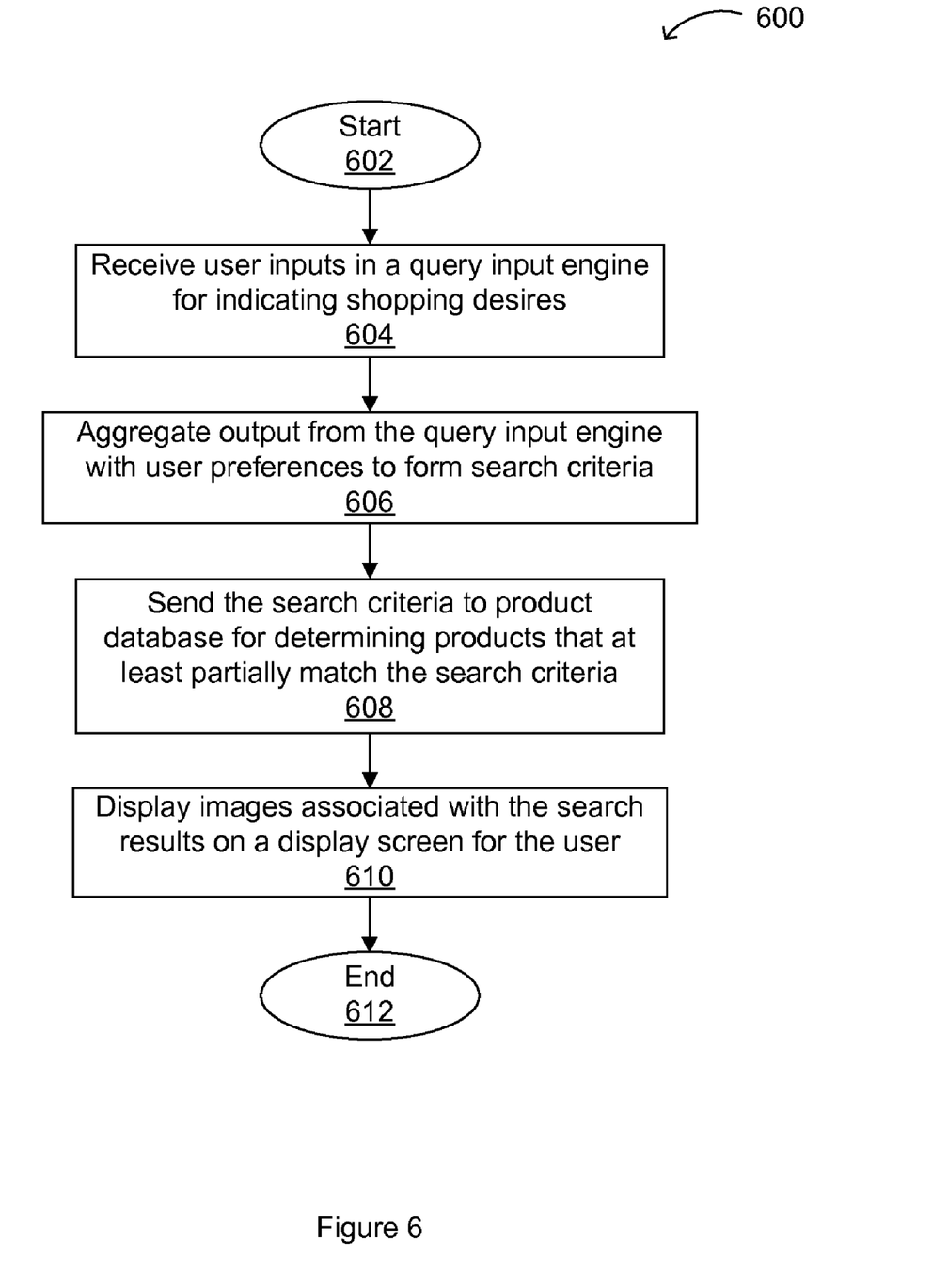
FIG. 6 illustrates a flow diagram of an example method of controlling a virtual shopping center in accordance with embodiments of the present invention.

FIG. 6 shows a flow diagram of an example method of controlling a virtual shopping center 600 in accordance with embodiments of the present invention. The flow can begin (602), and a query input for indicating shopping desires is received at query input engine 102 (604). For example, the user can specify a certain type of product, a vendor, an availability of the product, a geographic location of stores providing the product, and/or any other suitable product description. An output from query input engine 102 can then be aggregated with user preference information to form search criteria (606). For example, general user preference information can include descriptions of the consumer (e.g., residence location, income level, demographic info, etc.), general likes/dislikes, and so on. User preference information for specific product or service areas can include specific feature requirements, endorsement requirements, price ranges (e.g., whether the high-end, middle or low-end offering is generally preferred by the shopper), or any other suitable preference that can be related to a product or service.

The search criteria can then be sent to a product database for determining products that at least partially match the search criteria (608). For example, one or more fields in an entry in the product database may be sufficient for a partial match. In specific embodiments, products where all fields match the search criteria may be preferentially displayed. Images associated with the search results can then be displayed on a display screen for user viewing (610), completing the flow (612). The positioning (e.g., which store shelf and/or positioning thereon) of a product in the virtual shopping center can be determined based on factors such as vendors paying more for preferential position, higher levels of matching of the search criteria, and the like.

Although the description has been described with respect to particular embodiments thereof, these particular embodiments are merely illustrative, and not restrictive. For example, while search and system arrangements and product database structures have been described, other suitable arrangements, descriptions or search algorithms can also be utilized in particular embodiments.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

A "computer-readable medium" for purposes of particular embodiments may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method of controlling a virtual shopping center, the method comprising:
receiving a user input at a query input engine, wherein the user input indicates a shopping interest of the user;
aggregating, by a controller, an output from the query input engine with a user preference to form a search criteria, wherein the search criteria comprises a first field derived from the output of the query input engine, and a second field derived from the user preference;
searching a database using the search criteria from the controller; and
displaying a plurality of images on a display screen to form the virtual shopping center to satisfy the indicated shopping interest, wherein the plurality of images are associated with matching products or services resulting from the search of the database, and wherein the plurality of images are positioned in the virtual shopping center based on a predetermined priority of vendors that provide the matching products or services, the predetermined priority being based on relative payments made by the plurality of vendors.

2. The method of claim 1, wherein the display of the plurality of images comprises an interactive 360° view.

3. The method of claim 1, wherein the user preference comprises:
descriptions of the user;
information about product and service areas preferred by the user; and
a prior purchase history of the user.

4. The method of claim 3, wherein at least one of the plurality of images is selected for display in the virtual shopping center by using the prior purchase history of the user.

5. The method of claim 1, wherein the displaying the plurality of images comprises using a virtual reality system that allows navigation among the plurality of images.

6. The method of claim 1, wherein the searching the database comprises applying a search key derived from the search criteria to identify one or more matching entries.

7. The method of claim 1, wherein the database comprises a plurality of entries, and wherein each entry comprises at least one product description.

8. The method of claim 7, wherein each entry comprises a plurality of fields indicating a product type, a vendor, an availability, and an image.

9. The method of claim 7, wherein the plurality of entries is configured using metadata.

10. The method of claim 7, wherein the plurality of entries is configured using extensible markup language (XML).

11. An apparatus, comprising:
one or more processors; and
logic encoded in one or more tangible media for execution by the one or more processors, and when executed being operable to:
receive a user input at a query input engine, wherein the user input indicates a shopping interest of the user;
aggregate an output from the query input engine with a user preference to form a search criteria, wherein the search criteria comprises a first field derived from the output of the query input engine, and a second field derived from the user preference;
search a database using the search criteria; and
display a plurality of images to form a virtual shopping center to satisfy the indicated shopping interest, wherein the plurality of images are associated with matching products or services resulting from the search of the database, and wherein the plurality of images are positioned in the virtual shopping center based on a predetermined priority of vendors that provide the matching products or services, the predetermined priority being based on relative payments made by the plurality of vendors.

12. The apparatus of claim 11, wherein the display of the plurality of images comprises an interactive 360° view.

13. The apparatus of claim 11, wherein the user preference comprises:
descriptions of the user;
information about product and service areas preferred by the user; and
a prior purchase history of the user.

14. The apparatus of claim 13, wherein at least one of the plurality of images is selected for display in the virtual shopping center by using the prior purchase history of the user.

15. The apparatus of claim 11, wherein the display of the plurality of images comprises using a virtual reality system that allows navigation among the plurality of images.

16. The apparatus of claim 11, wherein the search of the database comprises application of a search key derived from the search criteria to a content-addressable memory (CAM).

17. The apparatus of claim 11, wherein the database comprises a plurality of entries, and wherein each entry comprises at least one product description.

18. The apparatus of claim 17, wherein the plurality of entries is configured using metadata.

19. The apparatus of claim 17, wherein each entry comprises a plurality of fields indicating a product type, a vendor, an availability, and an image.

20. A non-transitory computer-readable storage medium having a plurality of instructions stored thereon for execution by a processor, and when executed being operable to perform:
receiving a user input at a query input engine, wherein the user input indicates a shopping interest of the user;

aggregating an output from the query input engine with a user preference to form a search criteria, wherein the search criteria comprises a first field derived from the output of the query input engine, and a second field derived from the user preference;

searching a database using the search criteria; and displaying a plurality of images to form a virtual shopping center to satisfy the indicated shopping interest, wherein the plurality of images are associated with matching products or services resulting from the search of the database, and wherein the plurality of images are positioned in the virtual shopping center based on a predetermined priority of vendors that provide the matching products or services, the predetermined priority being based on relative payments made by the plurality of vendors.

* * * * *